(12) United States Patent
Lewis

(10) Patent No.: US 7,954,454 B2
(45) Date of Patent: Jun. 7, 2011

(54) SURE FEED AUTOMATIC FEEDER

(76) Inventor: Joe Lewis, Kountz, TX (US)

( * ) Notice: Subject to any disclaimer, the term of this patent is extended or adjusted under 35 U.S.C. 154(b) by 50 days.

(21) Appl. No.: 12/154,771

(22) Filed: May 27, 2008

(65) Prior Publication Data
US 2009/0120369 A1 May 14, 2009

(51) Int. Cl.
A01K 5/02 (2006.01)
(52) U.S. Cl. ...................................... 119/57.91
(58) Field of Classification Search ............... 119/51.01, 119/59.91, 68, 70, 51.11, 52.1, 57.91, 57.92, 119/59
See application file for complete search history.

(56) References Cited

U.S. PATENT DOCUMENTS

| 1,355,399 | A | * | 10/1920 | Kelley | 119/57.91 |
|---|---|---|---|---|---|
| 1,359,691 | A | * | 11/1920 | Genuit | 119/70 |
| 1,801,787 | A | * | 4/1931 | Zehner | 119/70 |
| 2,967,056 | A | * | 1/1961 | D'Amato | 239/657 |
| 3,195,508 | A | * | 7/1965 | Lehman et al. | 119/51.11 |
| 4,497,446 | A | * | 2/1985 | van der Lely et al. | 239/661 |
| 4,986,220 | A | * | 1/1991 | Reneau et al. | 119/57.91 |
| 5,820,035 | A | * | 10/1998 | Johnson et al. | 239/684 |
| 7,222,583 | B2 | * | 5/2007 | Foster et al. | 119/57.91 |
| 2007/0014642 | A1 | * | 1/2007 | Teodorescu et al. | 406/141 |

* cited by examiner

Primary Examiner — Rob Swiatek
Assistant Examiner — Ebony Evans
(74) Attorney, Agent, or Firm — Delphine James

(57) ABSTRACT

An automatic animal feeder, comprises a barrel, spinner plate, and control unit. Barrel is free standing large container for storing the feed. The bottom of the barrel forms a funnel for conducting the food into a spinner plate. A spinner plate is disposed directly below the funnel of the barrel. An elongated shaft extends vertically upward through the spinner plate and into the funnel of the barrel. A control unit containing an operationally timer is positioned below the spinner plate. The timer is set to come on at predetermined intervals throughout the day. When the timer in the control unit comes on, the shaft rotates within the funnel thereby facilitating the conduction of the feed into the spinner plate.

7 Claims, 4 Drawing Sheets

SURE FEED AUTOMATIC FEEDER

BACKGROUND

This invention specifically relate to feeding devices for animals. More specifically, this invention relates to automated animal feeding devices. Hunting is the sport of pursuing and killing wild game animals in order to provide food, or simply for the thrill of the chase, or for the enjoyment of outdoor life. Today, hunting is still a popular sport because of its challenge and pure pleasure as a sport. One of the methods used in hunting establishing a providing feeder which automatically sets out food to lure animals on the trail. This invention is a uniquely design animal feeder which stops feeding.

SUMMARY

One of the main objectives of the present invention is to provide an animal feeder that is effective against stoppage during use.

The present invention, an automatic animal feeder, comprises a barrel, spinner plate, and control unit. Barrel is free standing large container for storing the feed. The bottom of the barrel forms a funnel for conducting the food into a spinner plate. A spinner plate is disposed directly below the funnel of the barrel. An elongated shaft extends vertically upward through the spinner plate and into the funnel of the barrel. A control unit containing an operationally timer is positioned below the spinner plate. The timer is set to come on at predetermined intervals throughout the day. When the timer in the control unit comes on, the shaft rotates within the funnel thereby facilitating the conduction of the feed into the spinner plate.

DETAILED DESCRIPTION

Figure 1:
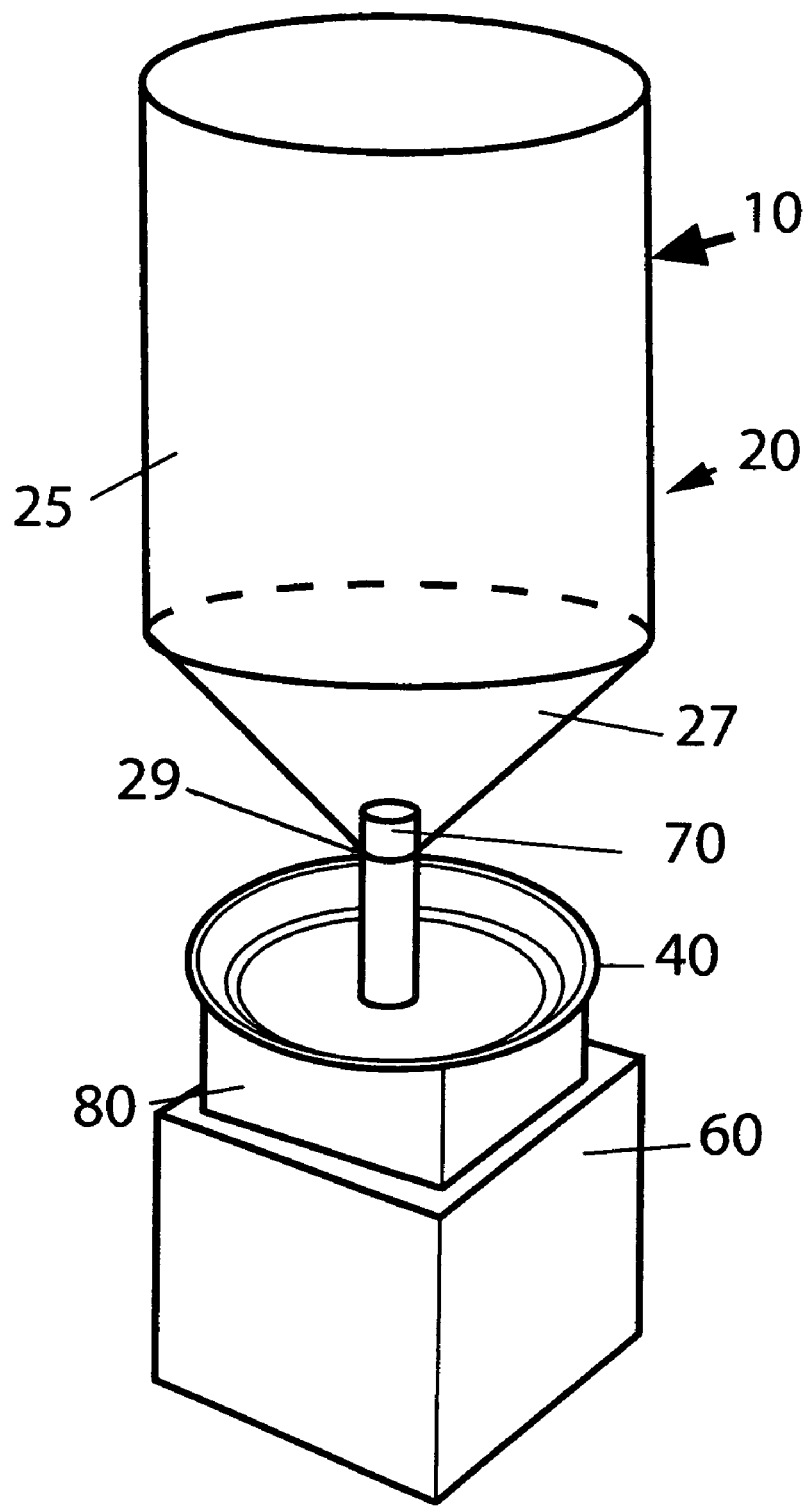
FIG. 1 illustrates a side perspective view of the present invention, animal feeder

Referring to FIG. 1, the present invention, an automatic animal feeder (10), comprises a barrel (20), spinner assembly (70), spinner plate (40), and control unit (60).

Barrel (20) is generally, a free-standing large container for storing the feed. Barrel (20) is surrounded by an upright circular base wall (25) with a bottom that forms funnel (27). Funnel (27) has a cone shape with opening (29) at the apex point. Funnel 27 conducts the feed through the opening (29) into spinner plate (40).

Figure 2:
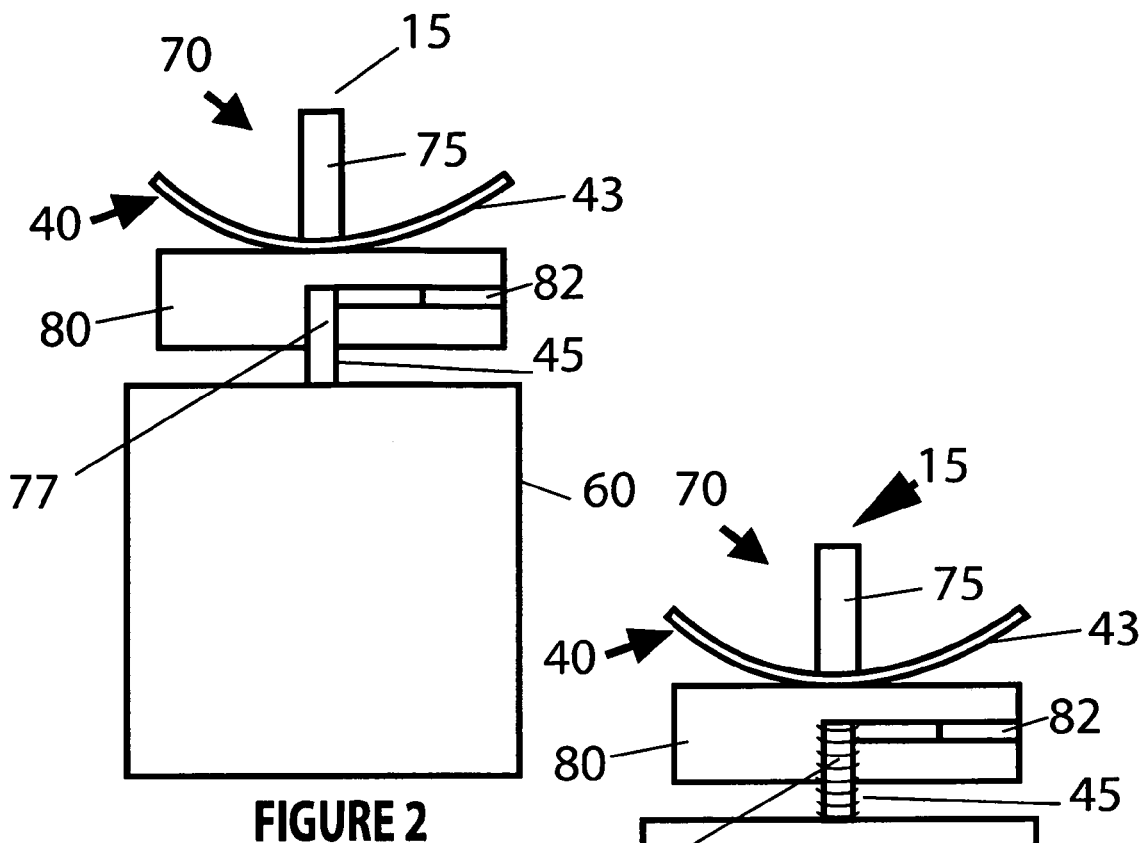
FIG. 2 is a top exploded view of spinner assembly.
Figure 7:
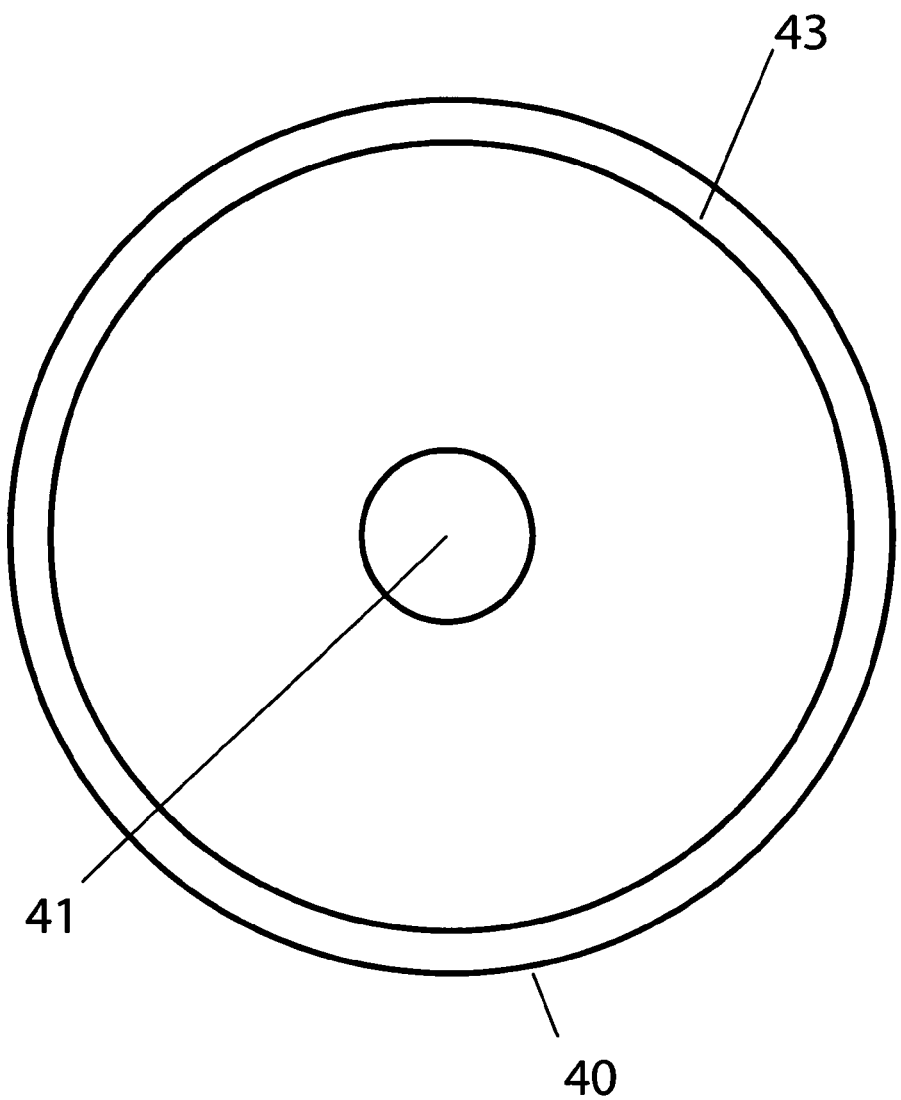
FIG. 7 is cross-sectional view of spinner plate.

As shown in FIG. 2, spinner assembly 70 further comprises rod 75 centrally, perpendicularly and rigidly mounted upon the topside of base 80. As depicted in FIG. 7 elongated rod 75 extends vertically upward along the central axis to a predetermined distance into opening 29 of funnel 27. As shown in FIG. 2, bore 77 is disposed within base 80 extending vertically upward along the central axis of base 80 from the under side of base 80 to a predetermined distance within base 80.

Spinner plate (40) is circular in the preferred embodiment with surrounding upright walls (43) extending a short distance upward. As shown in FIG. 7, disposed within the center of spinner plate 40 is aperture 41 for receiving rod 75 therethrough as shown in FIG. 1.

As depicted in FIGS. 1 and 2, elongated shaft (45) is fixably mounted upon the top of control unit (60) and extends vertically upward through spinner plate (40) and into the bore 77 of base 80. On one side of base 80 is a set screw 82 which extends horizontally therefrom into bore 77. Set screw 82 is adapted to secure shaft 45 within bore 77 of base 80.

Figure 3:
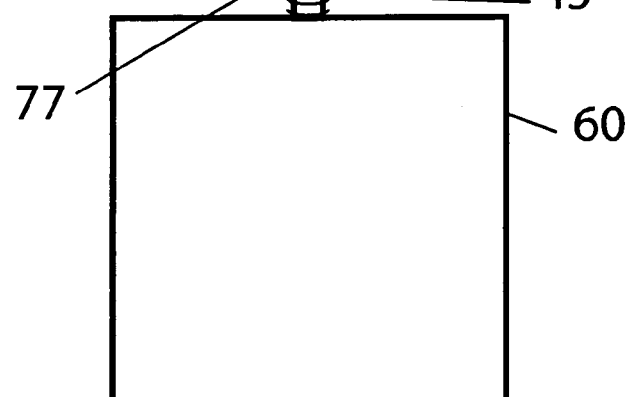
FIG. 3 is an alternative embodiment of spinner assembly.

Referring to FIG. 3, there is shown an alternative embodiment for spinner assembly 70. In this embodiment bore 77, is adapted with internal threads. As depicted, shaft 45 is adapted with mating threads for engagement with the internal threads within bore 77.

As shown in the preferred embodiment of FIG. 1, the upright wall (43) of spinner plate (40) can flare outward in an arc, alternatively at an obtuse angle or alternatively at a right angle. Upright wall (43) extends a predetermined distance approximately below the height of the funnel (27). This configuration allows the rate and amount of flow of feed through the opening (29) of the funnel (27) as the spinner plate (40) rotates in conjunction with shaft (45).

Figure 6:
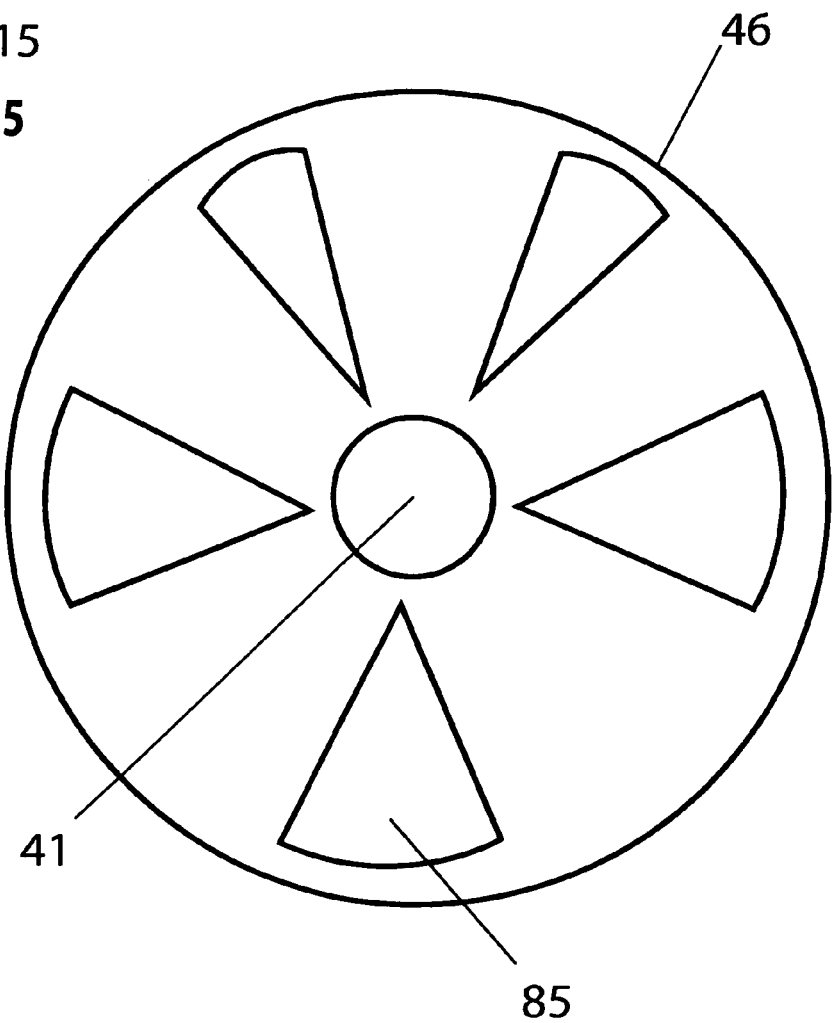
FIG. 6 is a top view of the spinner plate with fins.

As shown in FIG. 6, spinner plate 40 can be adapted with a plurality of spaced apart fins (85) circumferentially surrounding the peripheral edge (46) of spinner plate 40. Each fin (85) extends vertically upward to a predetermined distance below funnel (27).

Control unit (60) incorporates a conventional motor disposed below spinner plate (40). Control unit (60) can be adapted with a conventional timer for automatically setting the time for the elongated shaft (45) to rotate. In the preferred embodiment the conventional timer is set to rotate periodic throughout the day.

The rotation of the elongated rod 75 within the opening 29 prevents the stoppage of the feed from flowing through funnel 27. The rotation of rod 75 within funnel 27 causes vertical movement therein thereby preventing the stoppage of the funnel 27. This is the main advantage of this invention over the current automatic feeders in the market place today.

Control unit (60) can be adapted with a switch having control settings for controlling the movement of elongated shaft 45. The elongated shaft (45) can be adapted to rotate 360 degrees at a predetermined rate, can be adapted to pivot back/forth, can be adapted to move up/down or a combination thereof. The rate of movement of the elongated shaft (45) can be adjusted relative to the stirring rate of the feed within the funnel (27). In the preferred embodiment shaft (45) can be geared to rotate at different speeds through switch (64) of control unit (60).

Figure 5:
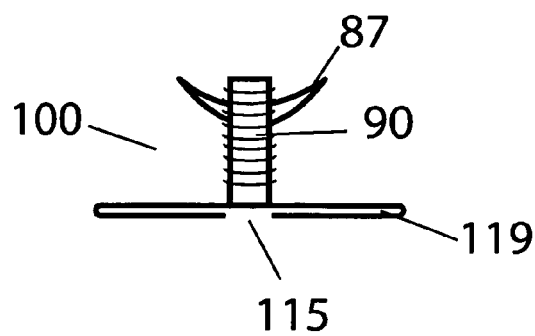
FIG. 5 is an exploded view of cover member.

As depicted in FIG. 5, the tip of the elongated rod (75) can be adapted with a plurality of spaced stirring spikes (87) or at least one. Each spike (87) is mounted to the external surface of elongated rod (75) not shown and protruded outwardly a short distance therefrom. Alternatively, the tip of the elongated rod (75) or the entire surface area of elongated rod (75) can be embedded with recesses forming a helical shape stirrer (90). With each rotation of elongated rod (75), helical shape stirrer (90) provides the capability of metering an exact amount of feed into spinner plate (40). In alternative embodiments both stirrer (90) and spikes (87) can be affixed to rod (75). The base (119) of rod (75) extends underneath rod (75).

Figure 4:
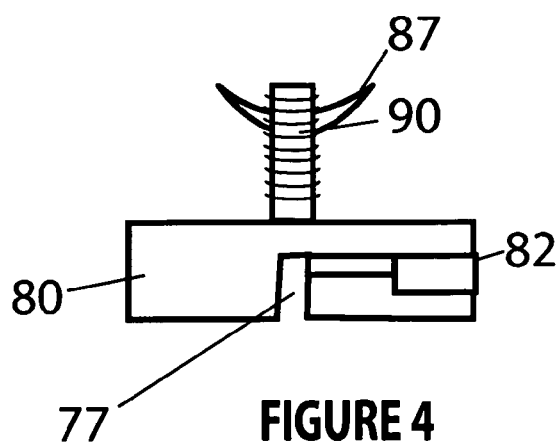
FIG. 4 is an alternative embodiment of spinner assembly.

As shown in FIG. 4, stirrer spikes 87 and/or helical shape stirrer spike 90 can be affixed to cover 100. In this embodiment, cover 100 comprises base 110 with a centrally located hollow shaft member 115 extending linearly upward therefrom. Hollow shaft member 115 is adapted to engage with elongated rod 75 shown in FIG. 2. In the preferred embodiment, hollow shaft member 115 is slidably engaged with elongated rod 75. In use, hollow shaft member 115 is engaged with elongated rod 75. Then, hollow shaft member 115 in conjunction with elongated rod 75 extends into the opening 29 of the funnel 27 as shown in FIG. 1.

What is claimed is:

1. An automatic feeder comprising:
    a barrel surrounded by a plurality of upright sidewalls with a bottom forming a funnel;
    the funnel having a cone shaped with an apex point forming an opening wherein feed is dispersed therethrough and into a spinner plate;
    the spinner plate being disposed below the opening at the apex point and-having a centrally located aperture therein;
    an elongated shaft centrally situated atop a control unit and extending linearly upward therefrom, the control unit adapted to control the rotation of the elongated shaft;
    a spinner assembly removably disposed atop the elongated shaft;
    a locking mechanism adapted to secure the spinner assembly upon the elongated shaft;
    the control unit disposed below the spinner assembly;
    and the spinner assembly further comprising:
        a base defined by a top side and an underside;
        an elongated rod perpendicularly and rigidly mounted upon the top side along a central axis of the base;
        the elongated rod extending vertically upward therefrom and extending through the aperture in the spinner plate and into the opening at the apex point of the funnel;
        a bore disposed within and along the central axis of base and extending, vertically upward from the under side of base to a predetermined distance within the base, the bore adapted to slidably engage with the elongated shaft therein wherein the rotational movement thereof causes rotationally movement of the elongated rod within the opening of the apex point causing movement within the opening that prevents stoppage of flow of the feed into the spinner plate; and
        the locking mechanism further comprises a fastener adapted to securely engage within an aperture extending horizontally from along a side edge of the base into the bore wherein the spinner assembly is secured in place.

2. The feeder of claim 1 wherein the spinner plate further comprises:
    a plurality of surrounding sidewalls extending, a short predetermined distance upward toward the apex point.

3. The feeder of claim 1 wherein the elongated rod further comprises
    at least one stirrer affixed to and perpendicularly mounted near the distal end of the elongated rod, the at least one stirrer protruding outward therefrom.

4. The feeder of claim 1 wherein the elongated rod further comprises a plurality of embedded recesses forming a helical shape stirrer and spanning at least a portion of the outer surface area of the elongated rod.

5. The feeder of claim 1 wherein the bore within the, base is adapted to threadedly engage with the elongated shaft disposed atop the control unit.

6. The feeder of claim 1, wherein the spinner plate further comprises a sidewall extending concavely upward to a predetermined distance upward.

7. The feeder of claim 1, wherein the spinner plate further comprises a plurality of fins circumferentially surrounding thereto.

* * * * *